United States Patent
Bobo et al.

(10) Patent No.: US 9,441,765 B2
(45) Date of Patent: Sep. 13, 2016

(54) LEAD-FREE HIGH TEMPERATURE/PRESSURE PIPING COMPONENTS AND METHODS OF USE

(71) Applicant: NIBCO INC., Elkhart, IN (US)

(72) Inventors: David A. Bobo, Granger, IN (US); Mark A. Clark, Elkhart, IN (US); Aaron W. Edds, Middlebury, IN (US); Benjamin L. Lawrence, Elkhart, IN (US); Charles M. Stutsman, Elkhart, IN (US)

(73) Assignee: NIBCO INC., Elkhart, IN (US)

( * ) Notice: Subject to any disclaimer, the term of this patent is extended or adjusted under 35 U.S.C. 154(b) by 0 days.

(21) Appl. No.: 14/942,325

(22) Filed: Nov. 16, 2015

(65) Prior Publication Data

US 2016/0069483 A1 Mar. 10, 2016

Related U.S. Application Data

(63) Continuation of application No. 14/625,127, filed on Feb. 18, 2015, now Pat. No. 9,217,521, which is a continuation of application No. 13/796,447, filed on Mar. 12, 2013, now Pat. No. 8,991,787.

(60) Provisional application No. 61/708,706, filed on Oct. 2, 2012.

(51) Int. Cl.
*F16L 9/02* (2006.01)
*F17D 1/00* (2006.01)
(Continued)

(52) U.S. Cl.
CPC ............. *F16L 9/02* (2013.01); *F16K 3/0263* (2013.01); *F16K 5/0657* (2013.01);
(Continued)

(58) Field of Classification Search
CPC ...... F16L 9/02; F17D 1/00; Y10T 137/0318; Y10T 428/12; Y10T 428/12903
USPC ......... 251/368; 420/469, 474–477, 490–491, 420/499
See application file for complete search history.

(56) References Cited

U.S. PATENT DOCUMENTS

| 3,685,547 A | 8/1972 | Tuppeny, Jr. |
| 5,167,726 A | 12/1992 | Lolacono et al. |

(Continued)

FOREIGN PATENT DOCUMENTS

| CN | 101845573 A | 9/2010 |
| EP | 1600517 B1 | 2/2009 |

(Continued)

OTHER PUBLICATIONS

Gurevitch, D.H., "Calculation and Design of Pipe Fittings," Edition 5-M.: Publ. LKI 2008, pp. 151, and 165-173.
(Continued)

*Primary Examiner* — Marina Tietjen
(74) *Attorney, Agent, or Firm* — Price Heneveld LLP

(57) ABSTRACT

A piping component for controlling the flow of fluids that includes a piping body having an inlet end and an outlet end, including methods of operating such components within a piping system. The piping body may be sized for fluids operating at temperatures from approximately 350° F. up to approximately 500° F., and up to approximately 650° F. In addition, the piping body is made from a silicon-copper alloy consisting essentially of less than 16% zinc, less than trace amounts of lead, less than trace amounts of bismuth, 2 to 6% silicon and a balance of copper (by weight). In certain aspects, less than 0.09% of lead and/or less than 0.09% bismuth are contained in the silicon-copper alloy.

20 Claims, 2 Drawing Sheets

(51) Int. Cl.
*F16K 3/02* (2006.01)
*F16K 5/06* (2006.01)
*F16K 25/00* (2006.01)
*F16L 43/00* (2006.01)

(52) U.S. Cl.
CPC .......... *F16K 25/005* (2013.01); *F16L 43/001* (2013.01); *F17D 1/00* (2013.01); *Y10T 137/0318* (2015.04); *Y10T 428/12* (2015.01)

(56) References Cited

U.S. PATENT DOCUMENTS

| | | |
|---|---|---|
| 7,354,489 B2 | 4/2008 | Hofmann et al. |
| 7,628,872 B2 | 12/2009 | Zhang et al. |
| 7,776,163 B2 | 8/2010 | Xu et al. |
| 7,883,589 B2 | 2/2011 | Oishi |
| 2002/0159912 A1 | 10/2002 | Oishi |
| 2005/0092401 A1 | 5/2005 | Oishi |
| 2005/0247381 A1 | 11/2005 | Oishi |
| 2007/0062615 A1 | 3/2007 | Oishi |
| 2007/0158002 A1 | 7/2007 | Oishi |
| 2007/0169855 A1 | 7/2007 | Oishi |
| 2009/0016927 A1 | 1/2009 | Oishi |
| 2010/0155011 A1 | 6/2010 | Xu et al. |
| 2011/0132569 A1 | 6/2011 | Xu et al. |
| 2011/0182768 A1 | 7/2011 | Wu et al. |
| 2012/0082588 A1 | 4/2012 | Kobayashi et al. |
| 2012/0118388 A1 | 5/2012 | Keyes |
| 2012/0121455 A1 | 5/2012 | Murray et al. |
| 2013/0276938 A1 | 10/2013 | Oishi |
| 2013/0294965 A1 | 11/2013 | Sahoo et al. |
| 2013/0315660 A1 | 11/2013 | Oishi |

FOREIGN PATENT DOCUMENTS

| | | |
|---|---|---|
| JP | 2010275573 A | 12/2010 |
| KR | 1020080050399 A | 6/2008 |
| WO | 9522028 | 8/1995 |

OTHER PUBLICATIONS

International Searching Authority, A. Anisimova, International Search Report, International Application No. PCT/US 2013/063059, mailed Dec. 19, 2013, 5 pages.

Kosowatz, J., "New Rules for New Copper Alloys," American Society of Mechanical Engineers, Aug. 2011, 4 pages.

Biwalite Co. Ltd., "Need a Lead Free Copper Alloy Casting? CDA C83470 in 2010," Brochure, 2010, 4 pages.

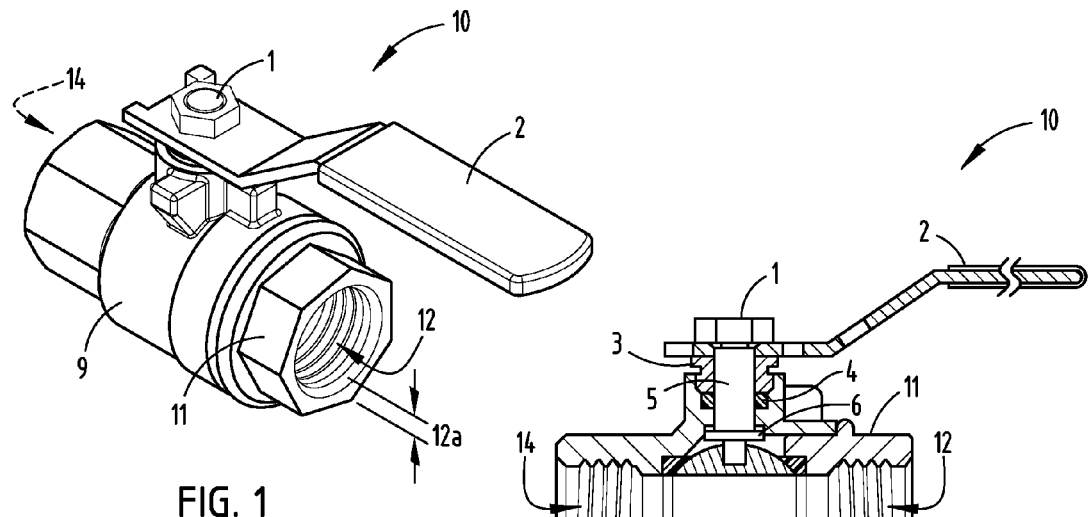
FIG. 1
FIG. 1A
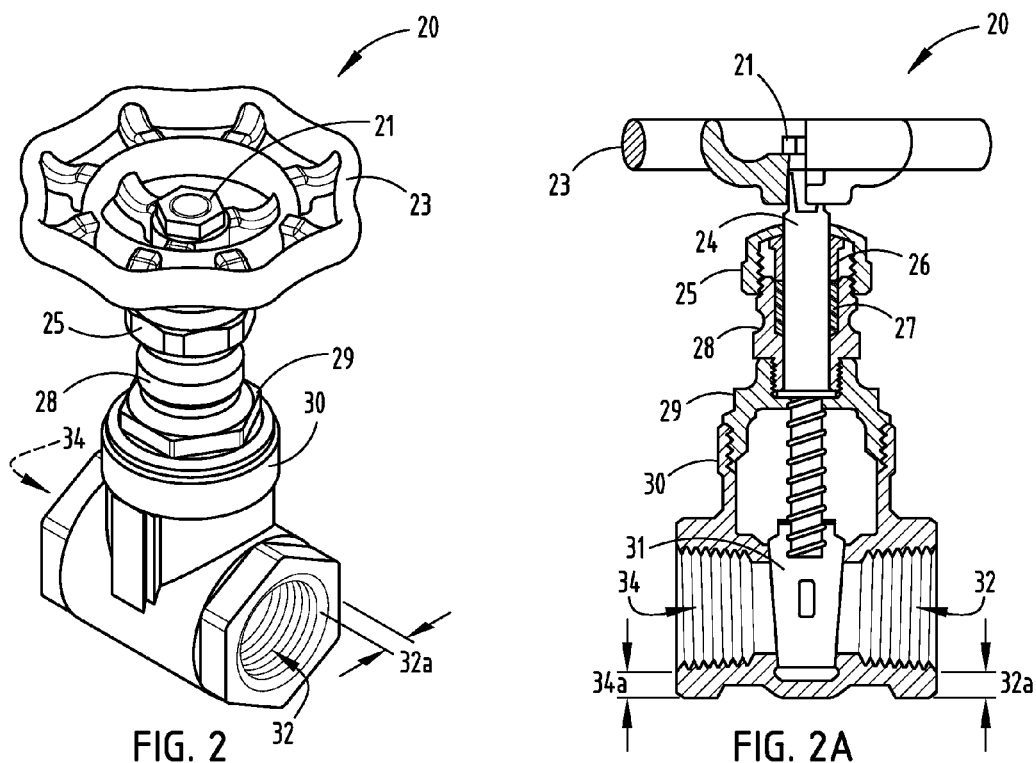
FIG. 2
FIG. 2A

LEAD-FREE HIGH TEMPERATURE/PRESSURE PIPING COMPONENTS AND METHODS OF USE

CROSS-REFERENCE TO RELATED APPLICATIONS

This application is a continuation application that claims the benefit under 35 U.S.C. §120 of U.S. patent application Ser. No. 14/625,127, filed Feb. 18, 2015, entitled "LEAD-FREE HIGH TEMPERATURE/PRESSURE PLUMBING COMPONENTS AND METHODS OF USE," now issued as U.S. Pat. No. 9,217,521, which is a continuation application that claims the benefit under 35 U.S.C. §120 of U.S. patent application Ser. No. 13/796,447, filed Mar. 12, 2013, entitled "LEAD-FREE HIGH TEMPERATURE/PRESSURE PLUMBING COMPONENTS AND METHODS OF USE," now issued as U.S. Pat. No. 8,991,787, which is incorporated by reference in its entirety herein. U.S. patent application Ser. No. 13/796,447 claims priority under 35 U.S.C. §119 to U.S. Provisional Patent Application No. 61/708,706, filed Oct. 2, 2012, entitled "LEAD-FREE HIGH TEMPERATURE/PRESSURE PLUMBING COMPONENTS AND METHODS OF USE," which is incorporated by reference in its entirety herein.

TECHNICAL FIELD

A fourth aspect of the disclosure is a piping component for controlling the flow of fluids that includes a piping body having an inlet end and an outlet end. The piping body is sized for fluids operating at a pressure of up to approximately 600 psi. In addition, the piping body is made from a silicon-copper alloy consisting essentially of less than 16% zinc, less than 0.25% lead, less than 0.25% bismuth, 2 to 6% silicon and a balance of copper (by weight).

BACKGROUND

Over the last decade, and earlier, health studies have demonstrated that human exposure to lead can have serious health consequences. Exposure to lead that has leached from leaded-copper alloy plumbing components into potable water is one health concern raised by these investigations. New legislation, including the recently-enacted Reduction of Lead in Drinking Water Act, has mandated the reduction of lead content in various plumbing components that are used in potable water systems. Some plumbing components made with lead-free copper alloys are now being sold for use in potable water, ambient temperature and pressure environments to comply with the new laws.

In contrast, leaded-copper alloys have been successfully used for decades to fabricate many piping components designed and certified (e.g., through ASME boiler pressure vessel codes) for use in systems containing fluids operating at high temperature and pressure. Generally, the fluids in these systems are not potable. Further, the lead in these alloys improves the manufacturability (e.g., ease of machining) and the corrosion resistance of components made from these alloys. For example, naval brass alloys, i.e., UNS C92200, are certified for high-temperature steam applications and possess appreciable amounts of lead.

BRIEF SUMMARY

A first aspect of the disclosure is a piping component for controlling the flow of fluids that includes a piping body having an inlet end and an outlet end. The piping body is sized for fluids operating at a temperature of up to approximately 500° F. In addition, the piping body is made from a silicon-copper alloy consisting essentially of less than 16% zinc, less than 0.25% lead, less than 0.25% bismuth, 2 to 6% silicon and a balance of copper (by weight).

A second aspect of the disclosure is a piping component for controlling the flow of fluids that includes a piping body having an inlet end and an outlet end. The piping body is sized for fluids operating at a temperature of up to approximately 650° F. In addition, the piping body is made from a silicon-copper alloy consisting essentially of less than 16% zinc, less than 0.25% lead, less than 0.25% bismuth, 2 to 6% silicon and a balance of copper (by weight).

A third aspect of the disclosure is a piping component for controlling the flow of fluids that includes a piping body having an inlet end and an outlet end. The piping body is sized for fluids operating at a pressure of up to approximately 400 psi. In addition, the piping body is made from a silicon-copper alloy consisting essentially of less than 16% zinc, less than 0.25% lead, less than 0.25% bismuth, 2 to 6% silicon and a balance of copper (by weight).

A fourth aspect of the disclosure is a piping component for controlling the flow of fluids that includes a piping body having an inlet end and an outlet end. The piping body is sized for fluids operating at a pressure of up to approximately 600 psi. In addition, the plumbing body is made from a silicon-copper alloy consisting essentially of less than 16% zinc, less than 0.25% lead, less than 0.25% bismuth, 2 to 6% silicon and a balance of copper (by weight).

A fifth aspect of the disclosure is a piping component for controlling the flow of fluids that includes a piping body having an inlet end and an outlet end. The piping body is sized for fluids operating at a temperature from approximately 350° F. up to approximately 500° F. In addition, the piping body is made from a silicon-copper alloy consisting essentially of less than 16% zinc, less than 0.25% lead, less than 0.25% bismuth, 2 to 6% silicon and a balance of copper (by weight).

A sixth aspect of the disclosure is a piping component for controlling the flow of fluids that includes a piping body having an inlet end and an outlet end. The piping body is sized for fluids operating at a pressure of up to approximately 400 psi and a temperature from approximately 350° F. up to approximately 500° F. In addition, the piping body is made from a silicon-copper alloy consisting essentially of less than 16% zinc, less than 0.25% lead, less than 0.25% bismuth, 2 to 6% silicon and a balance of copper (by weight).

A seventh aspect of the disclosure is a piping component for controlling the flow of fluids that includes a piping body having an inlet end and an outlet end. The piping body is sized for fluids operating at a temperature of up to approximately 500° F. In addition, the piping body is made from a silicon-copper alloy consisting essentially of less than 16% zinc, less than trace amounts of lead, less than trace amounts of bismuth, 2 to 6% silicon and a balance of copper (by weight).

An eighth aspect of the disclosure is a piping component for controlling the flow of fluids that includes a piping body having an inlet end and an outlet end. The piping body is sized for fluids operating at a temperature of up to approximately 500° F. In addition, the piping body is made from a silicon-copper alloy consisting essentially of less than 16% zinc, less than 0.09% lead, less than trace amounts of bismuth, 2 to 6% silicon and a balance of copper (by weight).

A ninth aspect of the disclosure is a piping component for controlling the flow of fluids that includes a piping body having an inlet end and an outlet end. The piping body is sized for fluids operating at a temperature of up to approximately 500° F. In addition, the piping body is made from a silicon-copper alloy consisting essentially of less than 16% zinc, less than trace amounts of lead, less than 0.09% bismuth, 2 to 6% silicon and a balance of copper (by weight).

A tenth aspect of the disclosure is a piping component for controlling the flow of fluids in proximity to a human in a heating system. The piping component includes a piping body having an inlet end and an outlet end. Further, the piping body is sized for the fluids operating at a temperature of up to approximately 500° F. In addition, the piping body is made from a silicon-copper alloy consisting essentially of less than 16% zinc, less than 0.25% lead, less than 0.25% bismuth, 2 to 6% silicon and a balance of copper (by weight). Still further, the piping body has an ultimate tensile strength of greater than about 57000 psi and a yield strength of greater than about 36000 psi at 500° F.

An eleventh aspect of the disclosure is a piping component for controlling the flow of fluids that includes a piping body having an inlet end and an outlet end. The piping body is sized for fluids operating at a temperature of up to approximately 500° F. In addition, the piping body is made from a silicon-copper alloy comprising less than 16% zinc, less than trace amounts of lead or bismuth, 2 to 6% silicon and a balance of copper (by weight). Still further, the piping body has an ultimate tensile strength of greater than about 57000 psi and a yield strength of greater than about 36000 psi at 500° F.

An additional aspect of the disclosure is a method of operating a piping component according to the first aspect of the disclosure. The method includes the steps of configuring the piping component within a system; and directing fluids that are operating at a temperature of up to approximately 500° F. in the system. The method also includes the step of controlling the piping component to control the flow of the fluids within the system.

A further aspect of the disclosure is a method of operating a piping component according to the second aspect of the disclosure. The method includes the steps of configuring the piping component within a system; and directing fluids that are operating at a temperature of up to approximately 650° F. in the system. The method also includes the steps of controlling the piping component to control the flow of the fluids within the system.

A still further aspect of the disclosure is a method of operating a piping component according to the third aspect of the disclosure. The method includes the steps of configuring the piping component within a system; and directing fluids that are operating at a pressure of up to approximately 400 psi in the system. The method also includes the steps of controlling the piping component to control the flow of the fluids within the system.

Another aspect of the disclosure is a method of operating a piping component according to the fourth aspect of the disclosure. The method includes the steps of configuring the piping component within a system; and directing fluids that are operating at a pressure of up to approximately 600 psi in the system. The method also includes the steps of controlling the piping component to control the flow of the fluids within the system.

A further aspect of the disclosure is a method of operating a piping component according to the fifth aspect of the disclosure. The method includes the steps of configuring the piping component within a system; and directing fluids that are operating at a temperature from approximately 350° F. up to approximately 500° F. in the system. The method also includes the step of controlling the piping component to control the flow of the fluids within the system.

These and other features, advantages, and objects of the disclosure will be further understood and appreciated by those skilled in the art by reference to the following specification, claims, and appended drawings.

BRIEF DESCRIPTION OF THE DRAWINGS

FIG. 1 is a perspective view of a ball valve sized for fluids operating at high temperature and/or pressure according to one embodiment.

FIG. 1A is a side, cross-sectional view of the ball valve depicted in FIG. 1.

FIG. 2 is a perspective view of a gate valve sized for fluids operating at high temperature and/or pressure according to another embodiment.

FIG. 2A is a side, cross-sectional view of the gate valve depicted in FIG. 2.

DETAILED DESCRIPTION

Figure 3:
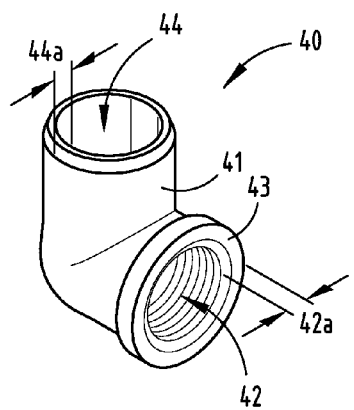
FIG. 3 is a perspective view of an elbow fitting sized for fluids operating at high temperature and/or pressure according to a further embodiment.

For purposes of description herein, the aspects of this disclosure may assume various alternative orientations, except where expressly specified to the contrary. The specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

It should also be understood that the term "fluids" as used herein includes steam, liquids and gasses.

Referring to FIGS. 1 and 1A, a ball valve assembly 10 for controlling the flow of fluids is depicted according to one aspect of the disclosure. As depicted, ball valve assembly 10 may include standard valve components including, but not limited to, a handle nut 1, handle 2, threaded pack gland 3, packing 4, stem 5, thrust washer 6, vented ball 7 and seat ring 8. These components are conventionally arranged within ball valve assembly 10. Further, these components function as known in the field.

In addition, the ball valve assembly 10 can possess a body composed of valve body 9 and body end piece 11. As shown in FIGS. 1 and 1A, the inlet end 12 of the valve assembly 10 is located within the end piece 11. The outlet end 14 of the valve assembly 10 is located within valve body 9. Valve assembly 10 can control and restrict the flow of fluid from the inlet end 12 to the outlet end 14. For example, handle 2 may be operatively connected to ball 7 and, accordingly, an operator may rotate handle 2 to move ball 7 to a position in which ball 7 blocks the flow of fluid from the inlet end 12 to the outlet end 14. Similarly, an operator can rotate handle 2 to another position to move ball 7 to a position in which ball 7 does not block the flow of fluid from the inlet end 12 to the outlet end 14.

As shown in FIGS. 1 and 1A, the valve body 9, end piece 11 and other components of valve assembly 10 are sized and otherwise configured to control the flow of fluids operating at high temperatures and pressures, above ambient conditions. For example, valve body 9 and end piece 11 can be sized to accommodate high-temperature fluids operating from approximately 350° F. up to approximately 500° F. Other configurations of valve assembly 10 are possible for high-temperature fluids operating at temperatures from approximately 350° F. up to approximately 650° F. Still further, valve assembly 10, including valve body 9 and end piece 11, can be configured for use with high-temperature fluids (e.g., steam) operating at pressures up to 400 psi, and high-temperature fluids operating at higher pressures up to approximately 600 psi. For example, the wall thickness 12a (at the inlet end 12) and/or the wall thickness 14a (at the outlet end 14) of the valve assembly 10 can be adjusted to accommodate fluids at these high service temperatures and pressures.

Certain components of the valve assembly 10 including, but not limited to, the valve body 9 and end piece 11 are fabricated from a silicon-copper alloy consisting essentially of less than 16% zinc, less than 0.25% lead, less than 0.25% bismuth, 2 to 6% silicon and a balance of copper (by weight). The inclusion of these silicon-copper alloy components within valve assembly 10 gives assembly 10 the capability to handle fluids operating at high temperatures and pressures. Other components of the valve assembly 10 in contact with the fluids at the operating temperatures and pressures, e.g., ball 7, may also be fabricated from these alloys.

The level of zinc in these silicon-copper alloys used in valve assembly 10 and other piping components suitable for high temperature and pressure service is important. Maintaining zinc levels below 16% by weight ensures that the piping components are not susceptible to de-zincification corrosion. Relatively low levels of zinc also ensure that the piping components do not suffer appreciable loss in strength at high temperatures via creep deformation.

Although lead may improve the machining aspects of piping components fabricated from silicon-copper alloys, such as valve assembly 10, the presence of lead in the alloy is detrimental to the high temperature and pressure performance of the piping component. This is because lead has a relatively low solubility in silicon-copper alloys, leaving it segregated throughout the part in discrete agglomerates. Further, lead has a low melting point, 621.4° F. As such, these lead agglomerates may melt when the piping components are used in high temperature and pressure environments, leading to a loss in mechanical properties. Indeed, a leaded silicon-copper alloy certified for high-temperature applications, UNS C92200, is only rated to 550° F. Hence, the significant reduction and near-elimination of the lead content in these alloys will significantly improve the overall high temperature and pressure performance of piping components made from these alloys.

Bismuth, like lead, also has a low solubility in silicon-copper alloys and segregates within the alloy matrix. The melting point of bismuth is 520.7° F. Accordingly, high levels of bismuth in the alloys used to make these piping components also can cause a reduction in their mechanical properties when used in high temperature and pressure service environments. Thus, high temperature and pressure piping components should be fabricated from silicon-copper alloys possessing very low levels of bismuth.

As such, piping components made from very low lead and bismuth silicon-copper alloys, e.g., alloys consisting essentially of less than 16% zinc, less than 0.09% lead, less than 0.09% bismuth, 2 to 6% silicon and a balance of copper (by weight), are also expected to deliver excellent performance for fluids operating at high temperature and pressures. Furthermore, piping components made from silicon-copper alloys consisting essentially of less than 7% zinc, less than 0.09% lead, less than 0.09% bismuth, 3 to 5% silicon and a balance of copper (by weight) are expected to deliver even better performance. Further engineering of these alloys to reduce lead and bismuth to levels below trace amounts, along with further zinc reductions, should also result in very good high temperature and pressure performance for these components. Accordingly, it is believed that piping components made from silicon-copper alloys consisting essentially of less than 4% zinc, less than trace amounts of lead, less than trace amounts of bismuth, 3 to 5% silicon and a balance of copper (by weight) will have superior high temperature and pressure performance.

The use of a lead-free alloy (less than 0.25% lead content) in valve assembly 10, and other piping components, operating at high temperatures and pressures is advantageous in certain respects. Although valve assembly 10 is typically employed with non-potable fluids, the elimination of lead from these valves should lead to overall improvements in the environment through the reduction of airborne lead exposure, for example. Further, the use of these silicon-copper alloys in piping components rated for high temperature and pressure service provides a potential cost savings. As similar alloys are also certified for use in plumbing components exposed to potable fluids operating at ambient conditions (e.g., UNS C87500), the development of piping components suitable for high temperature and pressure service with the disclosed silicon-copper alloys, and similar alloys, potentially allows manufacturers to provide piping and plumbing components manufactured from a common set of alloys for use across a variety of service conditions.

In addition, the subject piping components made from these lead-free silicon-copper alloys unexpectedly should have better high temperature mechanical property performance than components made with leaded alloys certified for use in high temperature and pressure service applications (e.g., UNS C92200). They also should perform better than components made with other "lead-free" alloys typically used in low temperature applications (e.g., UNS C89833 and UNS C87850).

In particular, Table 1 compares ultimate tensile strength, yield strength and percent elongation data as a function of temperature for four copper alloys: UNS C89833, C87850, C92200 and C87600. The composition of UNS C89833 is approximately 86 to 91% copper, less than 0.09% lead, 4 to 6% tin, 2 to 6% zinc, less than 0.005% silicon and 1.7 to 2.7% bismuth (by weight). Further, the nominal composition of UNS 92200 is approximately 88% copper, 1.5% lead, 6% tin, and 4.5% zinc (by weight). The composition of UNS C87850 is approximately less than 0.09% lead, less than 0.03% tin, 20.9% zinc, less than 0.1% manganese, 2.7 to 3.4% silicon and a balance of copper (by weight). Similar to UNS C89833 and C87850 alloys, the UNS C87600 alloy is a lead-free silicon-copper alloy only certified for use at low temperature (below 200° F.) and low pressures (below 200 psi). However, the composition of C87600 is approximately less than 0.09% lead, 4 to 7% zinc, 3.5 to 5.5% silicon and a balance of copper (by weight).

The data provided in Table 1 was compiled from testing of identical cast tensile bar specimens. The casting of the tensile bar test specimens was conducted in a production green sand mold foundry. Alloy heats were produced from 100% purchase ingot, certified by the ingot supplier. The chemistry of each alloy was verified using Optical Emission Spectroscopy Analysis and was confirmed to be within the appropriate alloy range. The ASTM E21 Standard Test Method for Elevated Temperature Tension Tests of Metallic Materials was used to generate the data provided in Table 1.

sures and fabricated from the lead-free silicon-copper alloys disclosed herein according to another aspect of the disclosure. Gate valve assembly 20 may include standard gate valve components including, but not limited to, a handwheel nut 21, handwheel 23, stem 24, packing nut 25, packing gland 26, packing 27 and wedge 31. These components are conventionally arranged within gate valve assembly 20. Further, these components function as known in the field.

In addition, gate valve assembly 20 can possess a body composed of stuffing box 28, bonnet 29, and valve body 30.

TABLE ONE

| Temp. | Ultimate Tensile Strength (PSI) | | | | Yield Strength (PSI) | | | | % Elongation | | | |
|---|---|---|---|---|---|---|---|---|---|---|---|---|
| (° F.) | C89833 | C87850 | C92200 | C87600 | C89833 | C87850 | C92200 | C87600 | C89833 | C87850 | C92200 | C87600 |
| R.T. | 27,200 | 69,000 | 30,900 | 74,500 | 18,000 | 27,200 | 17,100 | 37,350 | 10 | 37 | 15 | 25 |
| 100 | 28,100 | 68,000 | 39,000 | 74,000 | 19,200 | 20,800 | 18,800 | 37,800 | 11.7 | 36 | 35.7 | 27 |
| 150 | 20,200 | 71,000 | 30,500 | 72,750 | 16,600 | 32,500 | 17,300 | 36,250 | 5.6 | 35 | 15.4 | 25.5 |
| 200 | 22,400 | 69,500 | 27,500 | 74,500 | 16,700 | 19,300 | 17,500 | 36,600 | 7.9 | 34 | 16.1 | 29 |
| 250 | 21,700 | 66,500 | 31,400 | 71,500 | 17,500 | 24,000 | 17,500 | 37,550 | 7.8 | 33 | 17 | 31.5 |
| 300 | 18,600 | 68,500 | 34,000 | 70,500 | 15,800 | 25,800 | 14,600 | 35,350 | 5.9 | 27 | 26.2 | 29.5 |
| 350 | 21,200 | 67,500 | 36,100 | 71,400 | 15,300 | 25,700 | 16,100 | 36,350 | 4.7 | 37 | 26.9 | 29 |
| 400 | 20,500 | 56,000 | 34,100 | 66,250 | 15,500 | 26,900 | 17,900 | 37,200 | 4.2 | 26 | 26.3 | 28 |
| 450 | 17,600 | 60,500 | 29,800 | 64,750 | 13,100 | 29,900 | 16,700 | 36,750 | 5.9 | 28 | 13.6 | 20.5 |
| 500 | 11,900 | 55,500 | 26,200 | 57,000 | | 27,100 | 17,800 | 36,050 | 4.6 | 27 | 11.5 | 13 |
| 550 | 8,953 | 50,500 | 20,000 | 54,500 | | 26,400 | 16,000 | 37,450 | 3.1 | 25 | 4.3 | 12 |
| 600 | 11,500 | 48,500 | 18,200 | 47,100 | | 35,700 | | 33,700 | 2.2 | 29 | 3.6 | 7.85 |

As Table 1 demonstrates, the ultimate tensile strength and yield strength of the C89833 alloy (certified only for low-temperature use) drops appreciably above 250° F., likely due to its relatively high bismuth levels. Table 1 also shows the negative effect of high zinc levels in a copper alloy. Although the C87850 alloy (also only certified for low-temperature use) with approximately 21% zinc (by weight) possesses good tensile strength performance at temperatures well above 250° F., it exhibits high elongation percentages throughout the entire tested temperature range (R.T. to 600° F.). It is believed that these high levels of elongation will correlate to poor high temperature creep performance. Further, the naval bronze alloy, C92200, with its high lead content, demonstrates a significant reduction in strength performance above 500° F., despite being certified for use at temperatures approaching 500° F. It is now believed that these weaker mechanical properties above 500° F. (e.g., "hot-short" behavior) associated with the C92200 alloy are caused by its relatively high lead content.

In contrast, the lead-free silicon-copper alloy, C87600, certified only for low temperature and low pressure applications, unexpectedly performs very well at high temperatures. In particular, it exhibits high ultimate tensile strength and yield strength at temperatures exceeding 500° F. Similarly, the elongation percentages observed for the C87600 alloy are low in comparison to the other alloys tested. Given the newly-understood benefits for providing additional control of the zinc (i.e., zinc reductions below 7%, and even further to levels below 4%), lead (i.e., reducing the lead to levels below trace amounts) and/or bismuth (i.e., reducing the bismuth to levels below trace amounts) levels in these silicon-copper alloys discussed earlier, piping components made from silicon-copper alloys, refined from the C87600 composition, should demonstrate even better high temperature and pressure performance than components made with the tested C87600 alloy.

Referring to FIGS. 2 and 2A, other piping components, such as the depicted gate valve assembly 20, may be sized for fluids operating at high service temperatures and pres- As shown in FIGS. 2 and 2A, the inlet end 32 of the valve assembly 20 is located within body 30. The outlet end 34 of the gate valve assembly 20 is also located within body 30. Gate valve assembly 20 can control and restrict the flow of fluid from the inlet end 32 to the outlet end 34. For example, handwheel 23 may be operatively connected to wedge 31 via stem 24. Accordingly, an operator may rotate handwheel 23 to move wedge 31 to a position in which wedge 31 blocks the flow of fluid from the inlet end 32 to the outlet end 34. Similarly, an operator can rotate the handwheel 23 to another position to move wedge 31 to a position in which wedge 31 does not block (or does not completely block) the flow of fluid from the inlet end 32 to the outlet end 34.

As shown in FIGS. 2 and 2A, the valve body 30, stuffing box 28, bonnet 29 and other components of valve assembly 20 are sized and otherwise configured to control the flow of fluids operating at high temperatures and pressures, above ambient conditions. For example, valve body 30, stuffing box 28 and bonnet 29 can be sized to accommodate high-temperature fluids operating from approximately 350° F. up to approximately 500° F. Other configurations of gate valve assembly 20 are possible for high-temperature fluids operating at temperatures from approximately 350° F. up to approximately 650° F. Still further, gate valve assembly 20, including valve body 30, stuffing box 28 and bonnet 29 can be configured for use with high-temperature fluids (e.g., steam) operating at pressures up to 400 psi, and high-temperature fluids operating at higher pressures up to approximately 600 psi. For example, the wall thickness 32a (at the inlet end 32) and/or the wall thickness 34a (at the outlet end 34) of the gate valve assembly 20 can be adjusted to accommodate fluids at these high service temperatures and pressures.

Certain components of the gate valve assembly 20 including, but not limited to, the valve body 30, stuffing box 28, bonnet 29 are fabricated from the lead-free silicon-copper alloys as disclosed herein. The fabrication of these components with these silicon-copper alloys for gate valve assembly 20 gives the assembly 20 the capability to handle fluids operating at high temperatures and pressures. Other components of the gate valve assembly 20 in contact with the fluids at the operating temperatures and pressures, e.g., wedge 31, may also be fabricated from these alloys.

Figure 3A:
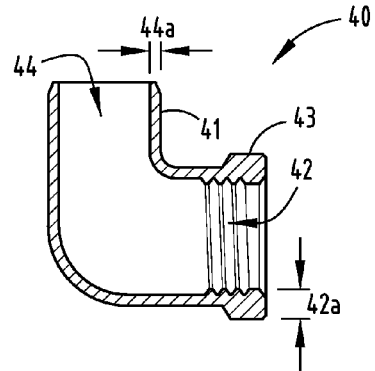
FIG. 3A is a side, cross-sectional view of the elbow fitting depicted in FIG. 3.

Referring to FIGS. 3 and 3A, other piping components, such as the depicted elbow fitting 40, may also be sized for fluids operating at high service temperatures and pressures and fabricated from lead-free silicon-copper alloys as disclosed herein according to a further aspect of the disclosure. As depicted, elbow fitting 40 may include standard features of an elbow fitting including, but not limited to, an elbow body 41, inlet 42, flange 43 and outlet 44. Further, the wall thickness 42a and 44a define the wall thickness of the elbow body 41 at the inlet end 42 and outlet end 44, respectively. These features are conventionally arranged within the elbow fitting 40 and generally function as known in the field. For example, the inlet end 42 and outlet end 44 of the elbow body 41 allow the elbow fitting 40 to control the flow of fluid from the inlet end 42 to the outlet end 44.

As shown in FIGS. 3 and 3A, the elbow fitting 40, including the elbow body 41 and flange 43, are sized and otherwise configured to control the flow of fluids operating at high temperatures and pressures, above ambient conditions. For example, elbow body 41 and flange 43 can be sized to accommodate high-temperature fluids operating from approximately 350° F. up to approximately 500° F. Other configurations of elbow fitting 40 are possible for high-temperature fluids operating at temperatures from approximately 350° F. up to approximately 650° F. Still further, elbow fitting 40, including elbow body 41 and flange 43 can be configured for use with high-temperature fluids (e.g., steam) operating at pressures up to 400 psi, and high-temperature fluids operating at higher pressures up to approximately 600 psi. For example, the wall thickness 42a (at the inlet end 42) and/or the wall thickness 44a (at the outlet end 44) of the elbow fitting 40 can be adjusted to accommodate fluids at these high service temperatures and pressures.

All of the features and components of elbow fitting 40 including, but not limited to, the elbow body 41 and flange 43 are fabricated from the lead-free silicon-copper alloys discussed earlier in this disclosure. The fabrication of the elbow fitting 40 with these alloys (and its sizing) gives it the capability to handle fluids operating at high temperatures and pressures.

It should be understood that the ball valve assembly 10, gate valve assembly 20 and elbow fitting 40 aspects of the disclosure depicted in FIGS. 1-3A are merely exemplary. Other piping components may be arranged for the control of fluids operating at high service temperatures and pressures and fabricated with the lead-free silicon-copper alloys discussed earlier.

Figure 4:
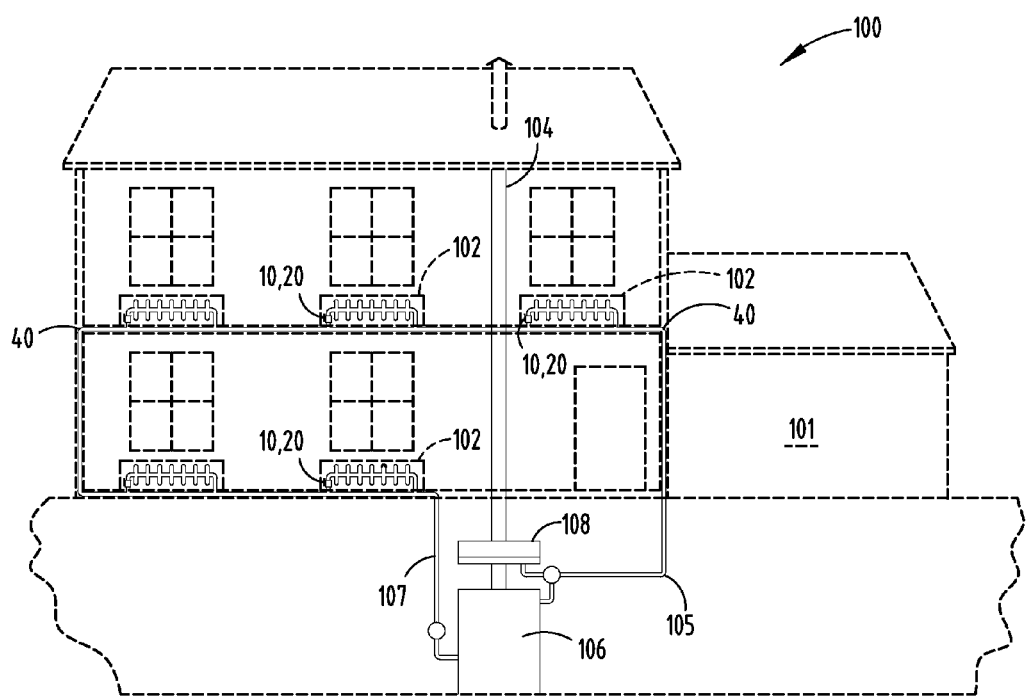
FIG. 4 is a schematic of a residential hot water heating system with piping components according to an additional embodiment.

Further, these piping components, including ball valve assembly 10, gate valve assembly 20 and elbow fitting 40 may be employed in methods of operating at high service temperatures and pressures according to another aspect of the disclosure. As shown in FIG. 4, hot water, residential piping system 100 relies on ball valve assemblies 10 and/or gate valve assemblies 20. Further, it includes elbow fittings 40. More generally, piping system 100 is situated within a house 101 and the system includes baseboard radiators 102, exhaust stack 104, a supply line 105, return line 107. The system 100 also includes a boiler 106 and expansion tank 108. The system 100 operates in a conventional fashion to deliver hot water (at or above 212° F.) and at ambient pressures or higher to radiators 102 for the purpose of heating house 101.

In particular, one may configure these high temperature and pressure piping components (e.g., valve assemblies 10 and 20, along with fittings 40) within piping system 100 as shown in FIG. 4. Each of these piping components can be employed to direct high-temperature fluids operating at temperatures from approximately 350° F. up to 500° F., temperatures from approximately 350° F. up to 650° F., and, additionally, high-temperature fluids (e.g., steam) operating at pressures up to 400 psi, and up to 600 psi (depending on the desired system arrangement). Further, these piping components are sized to accommodate fluids operating in these high temperature and pressure service regimes and fabricated from the lead-free silicon-copper alloys discussed earlier in this disclosure. An operator may operate these components to control the flow of the fluids operating in the system 100 (or other high temperature and/or pressure piping systems). An operator, for example, may adjust the ball 7 in ball valve assembly 10 (see also FIGS. 1 and 1A) to provide such fluid control. Similarly, a designer can adjust the degree of bend in the elbow fitting 40 to provide further fluid control.

Other variations and modifications can be made to the aforementioned structures and methods without departing from the concepts of this disclosure. These concepts, and those mentioned earlier, are intended to be covered by the following claims unless the claims by their language expressly state otherwise.

The invention claimed is:

1. A piping component, comprising:
a piping component for controlling the flow of fluids, the piping component comprising a piping body having an inlet end and an outlet end,
wherein the piping body is sized for fluids operating at a temperature up to approximately 500° F., and
further wherein the piping body is made from a silicon-copper alloy consisting essentially of less than 16% zinc, less than 0.25% lead, less than 0.25% bismuth, 2 to 6% silicon and a balance of copper (by weight).

2. The piping component according to claim 1, wherein the piping body is sized for fluids operating at a temperature up to approximately 650° F.

3. The piping component according to claim 1, wherein the silicon-copper alloy consists essentially of less than 7% zinc, less than 0.25% lead, less than 0.25% bismuth, 2 to 6% silicon and a balance of copper (by weight).

4. The piping component according to claim 1, wherein the silicon-copper alloy consists essentially of less than 4% zinc, less than 0.25% lead, less than 0.25% bismuth, 2 to 6% silicon and a balance of copper (by weight).

5. The piping component according to claim 1, wherein the piping component is selected from the group consisting of a ball valve, a gate valve and an elbow fitting.

6. The piping component according to claim 4, wherein the piping body is sized for fluids operating at a temperature up to approximately 650° F.

7. A piping component, comprising:
a piping component for controlling the flow of fluids in a hot water, residential piping system, the piping component comprising a piping body having an inlet end and an outlet end,
wherein the piping body is sized for the fluids operating at a temperature up to approximately 500° F.,
wherein the piping body is made from a silicon-copper alloy consisting essentially of less than 16% zinc, less than 0.25% lead, less than 0.25% bismuth, 2 to 6% silicon and a balance of copper (by weight), and further wherein the piping body has an ultimate tensile strength of greater than about 57000 psi and a yield strength of greater than about 36000 psi at 500° F.

8. The piping component according to claim 7, wherein the piping body is sized for the fluids operating at a temperature up to approximately 650° F.

9. The piping component according to claim 7, wherein the silicon-copper alloy consists essentially of less than 7% zinc, less than 0.25% lead, less than 0.25% bismuth, 2 to 6% silicon and a balance of copper (by weight).

10. The piping component according to claim 7, wherein the silicon-copper alloy consists essentially of less than 4% zinc, less than 0.25% lead, less than 0.25% bismuth, 2 to 6% silicon and a balance of copper (by weight).

11. The piping component according to claim 7, wherein the piping component is selected from the group consisting of a ball valve, a gate valve and an elbow fitting.

12. The piping component according to claim 10, wherein the piping body is sized for the fluids operating at a temperature up to approximately 650° F.

13. A piping component, comprising:
a piping component for controlling the flow of fluids, the piping component comprising a piping body having an inlet end and an outlet end,
wherein the piping body is sized for fluids operating at a temperature up to approximately 500° F.,
wherein the piping body is made from a silicon-copper alloy comprising less than 16% zinc, less than trace amounts of lead or bismuth, 2 to 6% silicon and a balance of copper (by weight), and
further wherein the piping body has an ultimate tensile strength of greater than about 57000 psi and a yield strength of greater than about 36000 psi at 500° F.

14. The piping component according to claim 13, wherein the piping body is sized for fluids operating at a temperature up to approximately 650° F.

15. The piping component according to claim 13, wherein the silicon-copper alloy comprises less than 7% zinc, less than trace amounts of lead or bismuth, 2 to 6% silicon and a balance of copper (by weight).

16. The piping component according to claim 13, wherein the silicon-copper alloy comprises less than 16% zinc, less than trace amounts of lead, 2 to 6% silicon and a balance of copper (by weight).

17. The piping component according to claim 13, wherein the silicon-copper alloy comprises less than 16% zinc, less than trace amounts of bismuth, 2 to 6% silicon and a balance of copper (by weight).

18. The piping component according to claim 13, wherein the silicon-copper alloy comprises less than 16% zinc, less than trace amounts of lead, less than trace amounts of bismuth, 2 to 6% silicon and a balance of copper (by weight).

19. The piping component according to claim 18, wherein the piping body is sized for fluids operating at a temperature up to approximately 650° F.

20. The piping component according to claim 13, wherein the piping component is selected from the group consisting of a ball valve, a gate valve and an elbow fitting.

* * * * *

UNITED STATES PATENT AND TRADEMARK OFFICE
CERTIFICATE OF CORRECTION

PATENT NO. : 9,441,765 B2
APPLICATION NO. : 14/942325
DATED : September 13, 2016
INVENTOR(S) : David A. Bobo et al.

It is certified that error appears in the above-identified patent and that said Letters Patent is hereby corrected as shown below:

In the Specification

Column 1, Lines 29-36, TECHNICAL FIELD should be:

– The disclosure relates to valves, fittings, flanges, assemblies and other piping components made from lead-free, silicon-copper alloys and sized for fluids (e.g., steam, liquids and gasses) operating at high temperatures and pressures. For example, the disclosed piping components can be employed in process, power and piping systems for a variety of end-use applications that include gas piping, refrigeration, heat transfer and building services. –

Column 2, Line 27:

"plumbing" should be – piping –

Column 6, Line 57:

"92200" should be – C92200 –

Signed and Sealed this
Third Day of January, 2017

Michelle K. Lee
*Director of the United States Patent and Trademark Office*